United States Patent
Lee

(10) Patent No.: US 11,820,915 B2
(45) Date of Patent: Nov. 21, 2023

(54) FUSION BONDED EPOXY REBAR POWDER COATINGS

(71) Applicant: SWIMC LLC, Cleveland, OH (US)

(72) Inventor: Weih Q Lee, Minneapolis, MN (US)

(73) Assignee: SWIMC LLC, Cleveland, OH (US)

( * ) Notice: Subject to any disclaimer, the term of this patent is extended or adjusted under 35 U.S.C. 154(b) by 554 days.

(21) Appl. No.: 16/693,945

(22) Filed: Nov. 25, 2019

(65) Prior Publication Data

US 2020/0190340 A1 Jun. 18, 2020

Related U.S. Application Data

(60) Provisional application No. 62/779,767, filed on Dec. 14, 2018.

(51) Int. Cl.
| | | |
|---|---|---|
| C09D 5/03 | (2006.01) | |
| C09D 7/65 | (2018.01) | |
| C09D 7/40 | (2018.01) | |
| C04B 20/10 | (2006.01) | |
| C09D 163/00 | (2006.01) | |
| E04C 5/01 | (2006.01) | |
| C08G 59/40 | (2006.01) | |

(52) U.S. Cl.
CPC .......... *C09D 5/031* (2013.01); *C04B 20/1037* (2013.01); *C08G 59/4035* (2013.01); *C09D 5/033* (2013.01); *C09D 7/65* (2018.01); *C09D 7/70* (2018.01); *C09D 163/00* (2013.01); *E04C 5/015* (2013.01)

(58) Field of Classification Search
CPC .......... C09D 5/08; C09D 5/031; C09D 5/033; C09D 163/00–10; C08G 59/4035; E04C 5/01; E04C 5/015
See application file for complete search history.

(56) References Cited

U.S. PATENT DOCUMENTS

| | | | |
|---|---|---|---|
| 4,420,605 A | 12/1983 | Kaufman | |
| 4,742,148 A | 5/1988 | Lee et al. | |
| 4,933,382 A * | 6/1990 | Kitagawa | ........... C08G 59/5073 523/428 |
| 5,244,939 A * | 9/1993 | Yasuda | ............. C08G 59/5073 523/466 |
| 5,747,565 A * | 5/1998 | Ono | ........................ C08G 59/56 525/934 |
| 5,965,673 A | 10/1999 | Hermansen et al. | |
| 6,329,473 B1 * | 12/2001 | Marten | ................. C08G 59/50 528/122 |
| 2008/0188626 A1 | 8/2008 | Verghese et al. | |

FOREIGN PATENT DOCUMENTS

| | | |
|---|---|---|
| CA | 2884878 A1 | 3/2014 |
| CN | 101671516 A | 3/2010 |
| CN | 101880375 A | 11/2010 |
| CN | 102101965 A | 6/2011 |
| CN | 103045051 A | 4/2013 |
| CN | 103952057 A | 7/2014 |
| CN | 103965435 A | 8/2014 |
| EP | 0304503 A1 | 3/1989 |
| JP | S59078267 A | 5/1984 |
| JP | S59157110 A | 9/1984 |
| JP | H0337220 A | 2/1991 |
| JP | H10265714 A | 10/1998 |
| JP | 2008248100 A | 10/2008 |
| KR | 1020160132278 A | 11/2016 |
| WO | 97/13589 A1 | 4/1997 |
| WO | 97/21751 A1 | 6/1997 |
| WO | 98/04531 A1 | 2/1998 |
| WO | 2009/129088 A1 | 10/2009 |
| WO | 2014/103652 A1 | 7/2014 |
| WO | 2015/025505 A1 | 2/2015 |
| WO | 2018/035007 A1 | 2/2018 |

OTHER PUBLICATIONS

International Patent Application No. PCT/US2019/063145, filed Nov. 26, 2019, International Search Report and Written Opinion dated Apr. 8, 2020, 9 pages.

\* cited by examiner

*Primary Examiner* — Kregg T Brooks

(57) ABSTRACT

This invention relates to fusion bonded epoxy rebar powder coating compositions of enough latency overtime, which cure in seconds upon residual heat up to 239.0° C., exhibiting low temperature flexibility to achieve crack-free rebar bending at −45° C. and a glossy finish without yellowing or discoloration. This invention further relates to rebar powder coatings compounded using suitable dihydrazide amines as the curing agent, in combination with an executive resin blend including a compatible toughening epoxy, and a synergic catalyst package to meet the intended application challenges.

8 Claims, No Drawings

FUSION BONDED EPOXY REBAR POWDER COATINGS

FIELD OF THE INVENTION

This application claims the benefit of U.S. provisional application No. 62/779,767 filed on Dec. 14, 2018, the entirety of which is hereby incorporated by reference.

The present invention relates to epoxy powder coating compositions generally, and more particularly to highly flexible and tough rebar surface coatings that sustain harsh post-cure bending and fabrication.

BACKGROUND OF THE INVENTION

Steel rebar and concrete are the most widely used construction materials in the modern society. Fusion bonded epoxy (FBE) coated rebar used within and together with concrete is critical to extending the life time of a wide variety of constructions, covering infrastructural facilities such as bridges, high-rise buildings, highways, and so on. As practical application data over time have confirmed, use of FBE power coated rebar significantly improves corrosion resistance, similar to those for steel oil and gas pipe applications. Of late, up to two thirds of bridges, highways, near sea civil and military buildings and ports, tunnels, wastewater treatment and chemical plants have already employed FBE coated rebar in construction. As of 2018, over 10% of rebars for all applications in the U.S. have been FBE coated, accounting for more than $30 million total market values of powder coating products.

Flexibility is critical to rebar coatings, but flexibility alone can hardly achieve crack-free performance either. Most commercial FBE rebar coating products, if not all, fall short in low temperature flexibility because they develop cracks upon post cure bending (e.g., cracking or micro-tearing when bent 180° in ~5 sec at −45° C. and or in 0.7 sec at ambient temperatures). Coating film cracks readily expose rebar steel surfaces to moisture and oxygen facilitating electrical corrosion, giving rise to stress-induced swelling, and eventually causing damages and collapses of construction structures.

Rebar powder coatings formulations are considered challenging because of two CTQ's (critical to quality requirements): 1) low temperature flexibility to allow quick 180° of bending free of cracks at 8-12mil dry film thickness, and 2) snap cure down to 15-20 sec at optional cure temperatures to maintain coating line speeds at 50-70 ft/min free of tracking marks on first contact of conveyors by freshly coated bars. FBE rebar coatings so far have been exclusively formulated with phenolic chemistry, taking advantage of phenolics that possess features favoring fast responsive cure and good flow and leveling (due partially to phenolic resins' low melting point at 75-115° C.), in addition to leveraging linearly structured bisphenol A based phenolic resin grades to maximize flexibility or minimize modulus. Disadvantageously, phenolic based rebar formulations are of poor latency especially when highly catalyzed to ramp up cure rates or shorten cure times to a greatest extent, causing frequent and quick bending performance deterioration. In addition, intimate contacts between molecules of phenolic resins and epoxies post extrusion (both melt and mix together) and throughout the life cycle result in processing and performance defects from time to time, and they are sometimes unavoidable. In summary, existing rebar powder coatings using phenolics lack robustness in both latency and processing consistency, producing high rebar crack and tear and re-work rates as widely seen. A great amount of efforts by some entities have been misleadingly focused on processing modifications, such as extrusion temperature control under 90° C. to curtail premature cure, optional screw configurations (e.g., single and dual screws), dual or multiple extrusions, as well as particle size and distribution control. These attempts may assist in performance consistency to some degree, but they hardly matter the crucial latency associated intrinsically with the phenolic formulation. Besides, rebar cracking is fundamentally a function of not only flexibility but also toughness and adhesion. Flexibility alone cannot prevent micro-cracking; adequate toughness and adhesion desired to resist tear and or peel are sometimes overlooked in order to solve the cracking issue in practice.

This present invention addresses all the issues above in one solution via FBE formulation using an amine, particularly a di-hydrazide curing chemistry, which entirely differentiates from any phenolic-centered modifications. Dihydrazides (e.g., sebacic dihydrazide or SDH for short) excluding adipic dihydrazide (ADH) are primary)(1°) amines of high melting points over 187.0° C. (a phase change temperature much greater than that of phenolics) providing substantially improved latency with epoxies over phenolics. As a result, extrusion of epoxy/dihydrazides can be processed at normal temperatures up to 125° C. instead of e,g., 90° C. as often controlled for epoxy/phenolics as explained; that significantly homogenizes the compounded premixes, i.e., uniformly dispersing yet not melting the highly-latent di-hydrazide particles with the melt resin system, provided that dihydrazide particles are fine enough to be fully dispersed. In addition to employing a principal solid amine catalyst, e.g., imidazoles of secondary (2°) and tertiary (3°) amines, di-methyl-amino-pyridine (DMAP) of tertiary amines (3°) only, amine adducts of primary (1°) and secondary (2°) amines, or imidazole adducts of tertiary amines (3°) only, a minor and liquid-converted catalyst can be incorporated to boost adhesion and bulk resin compatibility among ingredients; that additive catalyst is also of high latency and reactivity as per cure kinetics results. Such principal catalyst can be selected from the tertiary amine group consisting of 2-methyl imidazole, dimethylaminopyridine or amine adducts or imidazole adducts; and 2-propyl imidazole can be selected as the additive catalyst.

Furthermore, this invention includes a highly compatible toughening resin as part of the selected resin package optimized to enhance flexibility (or reduce modulus); the toughener can be a core-shell-rubber (CSR) modified type 4 epoxy in that MBS (methyl methacrylate-butadiene-styrene) serves as the core, or a block co-polymer modified with epoxy-miscible and epoxy-immiscible segments in its structure. The latter (i.e., the block copolymer derived) is said to self-assemble to form a secondary phase of toughening forming a bulk epoxy resin network during cure. CSR and block copolymer modified toughening resins outperform others such as CTBN, or acrylic modified epoxy resins as competitively tested in the scope of this invention. Generally, the innovative formulations represent an effective effort intended to solve all rebar coating associated issues in one solution.

SUMMARY OF THE INVENTION

In one embodiment, the present invention provides a coated structural steel rebar and at least an FBE powder coating composition applied thereon. The powder coating composition of this invention comprises:

(a) a flexible dihydrazide represented by the following general structure:

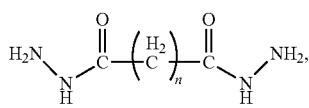

where n=4–20; and (b) a dial catalyst package comprising a principal catalyst comprising at least one amine catalyst, which can be selected from the tertiary amine group consisting of 2-methyl imidazole, dimethylaminopyridine or an amine adduct, or an imidazole adduct, and the additive catalyst can be selected from an imidazole amine group, such as 2-propyl imidazole (2PI); and (c) an epoxy binder resin system comprising:
  a. 7.5% to 22.5 wt % of a toughening resin;
  b. 77.5% to 92.5 wt % of a bulk epoxy resin package comprising a blend of epoxy resins having EEW between 800 and 2000;

all wt % based on the total weight of the resin corresponding to an effective stoichiometric resin to curing agent molar ratio from 1.0:1 to 5.0:1 (the resin to the curing agent).

Preferably, the tougher resin is core-shell-rubber (CSR) modified epoxies having EEW of 920 to 1090 g/eq (i.e., MBS or methyl methacrylate-butadiene-styrene copolymer as the core portion) and alternatively an amphilphilic OP (PEO-PEP) diblock copolymer modified ones having EEW of 960 to 1060 g/eq as well as having epoxy miscible and epoxy immiscible parts structured as poly(ethylene oxide)-poly(ethylene propylene), wherein PEO is epoxy-philic. The bulk epoxy resin package can comprise a blend of, for example, Type 4 and Type 7 resins, or other combinations.

The coating of this invention, when applied to a rebar test bar, as described herein, demonstrates a high flexibility at very low temperatures (−45° C.) and enough stability over time up to 12 months without sacrificing end performance, as well as very short cure times down to 16 seconds upon preheating at 239° C. Preferably, in accordance with this invention, the ratio of the Type 4 resin and the Type 7 resin ranges from 1:8 to 4:1, or more preferably, 1:6 to 2:1, wherein the Type 4 resin has an EEW of between 800 and 1225 and Type 7 resin has an EEW of between 1650 and 2000, if the coating composition comprises a resin package of Type 4 and Type 7 combinations.

The above summary of the present invention is not intended to describe each disclosed embodiment or every implementation of the present invention. The description that follows more particularly exemplifies illustrative embodiments. In several places throughout the application, guidance is provided through lists of examples, which can be used in various combinations. In each instance, the recited list serves only as a representative group and should not be interpreted as an exclusive list.

The details of one or more embodiments of the invention are set forth in the description below. Other features, objects, and advantages of the invention will be apparent from the description and the claims.

Selected Definitions

Unless otherwise specified, the following terms as used herein have the meanings as provided below.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention. For instance, a resin combination of Type 4 and Type 7 demonstrated in embodiments is not limited to such or exclude any others; instead, it comprises any resin mixtures among Type 4, 5 and 7, e.g., Type 4 or Type 5 or Type 7 alone, Type 4 and Type 5, Type 4 and Type 7, Type 5 and Type 7, Type 4 and Type 5 and Type 7, and so on.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

This invention solves the crack, micro-tear and peel-off problems of rebar coatings along with improving processability and stability overtime, wherein selected flexible dihydrazides as the crosslinker combined with a novel epoxy resin package consisting of a compatible toughening resin and a balanced bulk epoxy blend, such as a Type 4 and Type 7 blend, provide for flexibility (that prevents cracking) and toughening (that prevents micro-tearing) and adhesion (that prevents peeling off). A dual catalyst package comprising 2PI (that is viscous liquid or semi-solid at room temperature, encapsulated at 60% active with fumed silica as the carrier) affords compatibility and enhanced adhesion. Concurrently, this invention provides sufficient latency as a result of the dihydrazide amines with melting temperatures much higher than phenolics, also allowing for advantageous extrusion temperature up to 125° C. to be used (relatively high temperature extrusion enables fully homogenized compounding.

The combinations of flexibility (via dihydrazides and resin blends) and adhesion (via flow and wetting as partially conferred by 2PI) and cohesion (via toughening) as well as fully dispersed dihydrazide resin particles among coating ingredients address the challenges of rebar coatings.

The coatings of this invention primarily take advantage of the dihydrazide chemistry, (1) achieving crack free bending performance down at −45° C.; 2) improving product latency (DSC onset temperatures >130° C. vs. existing phenolic formulations ≤120° C. run at 20° C/min) that lead to adequate shelf life for storage and transportation with few concerns about premature curing or impaired end performance over time. In addition, they allow regular and friendly extrusion temperature settings up to 125° C. (no more limited to ≤90° C. as sometimes applied onto phenolic cured rebar products).

The coatings of this invention utilize flexible dihydrazides together with an epoxy resin package of maximized flexibility and flow potentials that allow the coating upon cure to withstand cracking when bent at varying degrees per pipe diameter (°/PD) at extremely low temperatures (down to −45° C.) while maintaining strong adhesion to steel rebar substrates. Epoxy thermosetting cure is a complicated process involving a series of competing reactions consisting of etherification (epoxy homo-polymerization) and cross-linking polyaddition initiated or catalyzed by tertiary (3°) amines. Homo-polymerization represents linear chain propagation that eventually provides flexibility to support crack-free bending while cross-linking leads to a polymeric network with adequate toughness, mechanical strength and integrity.

Dihydrazides

The curing agents or crosslinkers employed in this invention include one or more flexible dihydrazides of four (4) active primary (1°) amine functionalities having the following general structure:

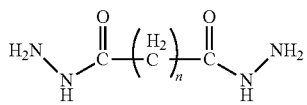

where n=4-20;

The ratio of epoxy equivalent weight (EEW) to amine hydrogen equivalent weight (EW-NH) in this invention should be selected within 1.0:1 to 6.0:1, preferably between 1.2:1 and 3.0:1. For example, for an epoxy resin that has reactive glycidyl groups, a more preferred molar ratio of glycidyl groups in the epoxy resin to amino groups in the curing agent is in a range of 1.5:1 to 2.8:1.

In one embodiment, dihydrazides such as ADH, SDH, DDH, LDH, and UDH are identified as suitable curing agents in this invention with SDH (melting temperature $T_m$=187° C. vs. $T_m$ of phenolics<115° C.) preferred. SDH has a linear $CH_2$ chain of eight (8) in between functional end groups imparting flexibility. SDH has a high melting point that provides desired latency. Preferred dihydrazides include the following:

a)

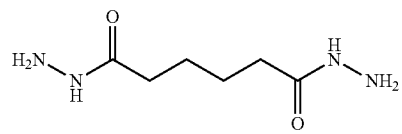

ADH (Adipic dihydrazide)
EW-NH: 43.75 g/eq, $T_m$ = 180° C.

b)

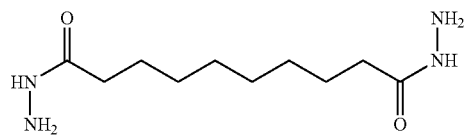

SDH (Sebacic dihydrazide)
EW-NH: 57.5, $T_m$ = 187° C.

c)

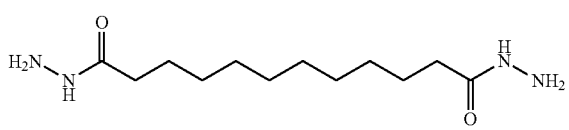

DDH (Decane dihydrazide)
dihydrazide)
EW-NH: 64.5, $T_m$ = 190° C.

d)

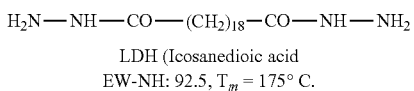

LDH (Icosanedioic acid
EW-NH: 92.5, $T_m$ = 175° C.

In one embodiment, between carbonyl parts of the hydrazide can contain saturation, such as in the following:

e)

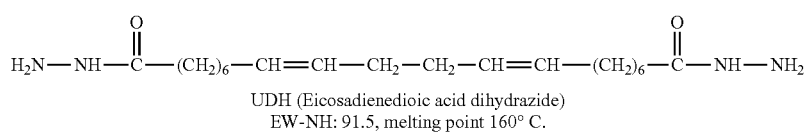

UDH (Eicosadienedioic acid dihydrazide)
EW-NH: 91.5, melting point 160° C.

SDH as the core crosslinker composition used in this invention preferably has a fine particle size of averaged 3 to 6 microns. Fine particle size and narrow particle size distribution permit unmelt SDH resin particles to be fully and uniformly dispersed into the resin system by extruder, eventually in favor of acceptable and best possible performance in terms of bending cracks. By comparison, coarse particle size of SDH at averaged 30 to 60 microns are determined to consistently fail rebar crack performance.

Catalysts

The catalyst used in this invention is a dual catalyst system. The principal catalyst useful in this invention is an amine catalyst, preferably 2-methyl imidazole (2MI) or DMAP or an amine adduct or an imidazole adduct, as structurally shown below, 2MI and DMAP and the imidazole adduct (shown) are equivalent in terms of reactivity at a given phr (per one hundred resin) loading level according to DSC cure kinetic data. Amine adducts (such as, e.g., Epikure P100, Aradur 3088, or Epikure P101) are slightly less reactive but their reactivity can be elevated by increasing the loading level. DMAP and an imidazole adduct (containing 3° amines only) tend to promote more epoxy homo-polymerization over crosslinking than 2MI does; homo-polymerization imparts flexibility as taught by this invention. Preferably, the amount of 2MI or DMAP or an amine adduct or an imidazole adduct in these inventive compositions ranges generally from 1 to 4 phr in one embodiment; more preferably from 1 to 2 phr, closely related to the stoichiometric ratio to be chosen and depending on the gel and cure time to be achieved in another embodiment.

a)

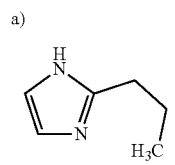

2-propyl-imidazole
MW: 110.2, $T_m$ 62° C.

b)

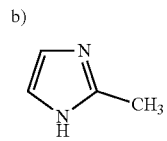

2-methyl-imidazole
MW: 82.1, $T_m$ 145° C.

c)

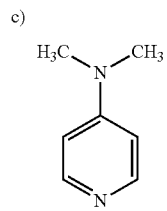

DMAP
MW: 122.2, $T_m$ 113° C.

d)

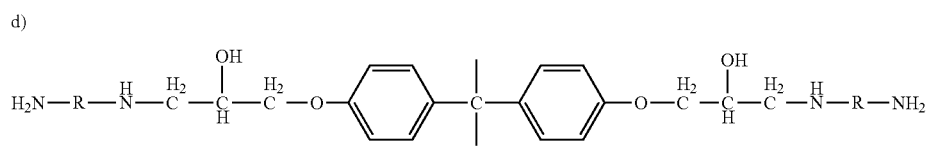

Amine adduct: MW various, $T_m$ 85-105° C.

e)

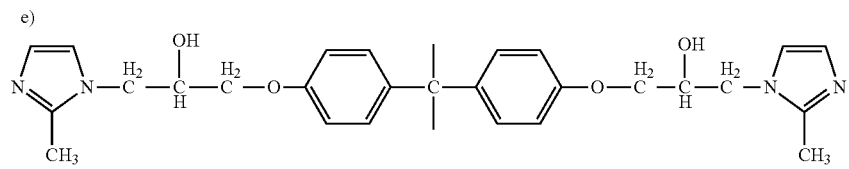

Imidazole adduct: MW various, $T_m$ 85-105° C.

A second and additive catalyst in accordance with this invention is also from the imidazole amine group, more specifically, 2PI, which is the only viscous liquid or semi-solid imidazole at ambient temperatures. Because of its liquid form, 2PI is of better compatibility or dispersibility with epoxies than 2MI or DMAP or amine/imidazole adducts, facilitating homogenized mixing of coating ingredients in this invention, and promoting flow and leveling thus to improve adhesion in support of crack or peel free bending performance even at a low phi loading level in combination with the principal catalyst. Meanwhile, 2PI is of much higher latency (due to steric effects) than 2MI or DMAP or amine/imidazole adducts while it becomes highly reactive (as reactive as amine adducts but not so reactive as 2MI or DMAP or imidazole adducts) upon thermal activation, hence improving coating stability while maintaining reactivity required for snap cure. The amount of 2PI can be selected by cure kinetic results as well. For instance, the amount of 2PI of 100% active may range from 1 to 10% by weight of the amount of the principal catalyst such as 2MI or DMAP or amine/imidazole adducts used in one embodiment of this invention.

Toughening Resins

The use of a toughening epoxy in the resin composition of the present invention typically leads to enhanced cohesion (supporting bending tear free) while not impairing flexibility (supporting bending crack free), provided that the toughening resin is highly compatible with the bulk resins.

The toughening agent is typically an organic polymer additive that phase separates in a cured epoxy resin network. The toughening resin useful in the present invention may include for example MBS or methyl methacrylate-butadiene-styrene copolymer modified type 4 epoxy of core-shell rubber (CSR) structures, block copolymer modified, polyol modified, DCPD (dicyclopentadiene) modified, rubber (CTBN, acrylic, and others) modified, or mixtures thereof.

One embodiment of the toughening epoxy useful in the present invention may include for example, a CSR modified such as Fortegra 304 used in this invention, and alternatively an amphiphilic diblock copolymer-modified epoxy. Polyol- and DCPD-modified (such as XU-19741 and Epiclon HP-7200H or XD-1000, respectively) are tested to be slightly inferior in terms of micro-tearing. Preferably, the amphiphilic diblock copolymer-modified epoxy useful in the present invention may include PEO-PEP (polyethylene-polyethylene-propylene) modified epoxy derived from bisphenol A; more preferably, the toughening agent used in this invention is FORTEGRA™ 664-12. Both Fortegra 304 and 664-12 turn out to be highly compatible with compositions of this invention, and they can self-assemble to form the second phase of toughening rubber core during cure.

The concentration of the toughening agent used in the curable compositions described herein may depend on a variety of factors including the equivalent weight of the polymers, and the desired flexibility and toughening properties of the product made from the curable composition. In general, the toughening agent may be used in an amount sufficient to provide the resulting composite enough toughness to prevent micro-cracking (i.e., tearing) of the coating. For example, the amount of the toughening resin may range generally from about 7.5 wt % to about 22.5 wt % in one embodiment, from about 10 wt % to about 20 wt % in another embodiment, and from about 12 wt % to about 15 wt % in even still another embodiment, based on the total weight of the resin composition.

Bulk Epoxy Resins

A bulk epoxy resin package as one of viable options preferably consists of 70% Type 7 (e.g., Epon 1007F), 17.5% Type 4 (e.g., Epon 2004), and 12.5% toughening resin (e.g., Fortegra 664-12 or Fortegra 304), creating a system of superior flexibility and adhesion and toughness desired once preferably cured by dihydrazides with ADH and SDH used at an equivalent ratio of 1:1.5 to 1:2.8 (crosslinkers to resins) and preferably catalyzed by the above described dual catalyst package of 2MI at 1.25 to 1.80 phr along with 2PI at ~3.0% of the 2MI total by weight. It should be noted that the amounts of catalysts are selected from cure kinetic results; 2PI is confirmed to improve or compliment performance within.

|  | Type 4 | Type 5 | Type 7 |
|---|---|---|---|
| EEW, g/eq | 800-1225 | 1300-1350 | 1650-2000 |
| $T_m$, ° C. | 90-120 | 105-125 | 115-140 |
| Viscosity, cST at 125° C. | 3,000-10,000 | 30,000-55,000 | over 50000 |

Various combinations for epoxy resins can be used if desired, although the disclosed combination in this invention appears to perform best. The solid epoxy resin may have an equivalent epoxy weight (EEW) of 800 to 2000. These resins are often described by their "type" to indicate molecular weight (MW). Type 4 and 7 are suitable here; again, it does not mean the resin package in the compositions of this invention is limited only to this specific option.

Type 4 resins may have an EEW of 800-1225, Type 5 resins have an EEW of 1300-1350 and Type 7 resins may have an EEW of 1650-2000. Commercial examples of Type 4 resins include Epon-2004, KD-214C, YD-904. Commercial examples of Type 5 resins include EPON 2005, YD-905, and commercial examples of Type 7 resins include Epon-1007F, YD-017.

In a preferred embodiment, the powder coating composition includes an epoxy resin system comprising:
 (a) 7.5% to 22.5 wt % toughener resin, wherein the toughener resin is Fortegra 304 or 664-12;
 (b) 7.5% to 62.5 wt % of an epoxy Type 4 having an EEW of between 800 and 1225; and
 (c) 15.0% to 85.0 wt % of an epoxy Type 7 having an EEW of between 1650 and 2000, all wt % based on the total weight of the resin.

In accordance with this invention, where Type 4 and Type 7 resins arc employed, the ratio of the Ty
 pe 4 resin and the Type 7 resin ranges from 1:8 to 4:1.

Accordingly, in a preferred embodiment, the powder composition described herein is a fusion-bonded epoxy (FBE) composition. Preferred compositions include an epoxy resin prepared from a homogenous mixture of a toughening resin, and Type 4 epoxy resin, and Type 7 epoxy resin, along with a flexible dihydrazide curing agent and dual imidazole catalysts. In an aspect, the fusion-bonded epoxy composition is present in an amount of about 65 to 95 wt %, preferably about 70 to 95 wt %, more preferably about 77.5 to 92.5 wt %, and most preferably about 80 to 92.5 wt % based on the total weight of the powder composition.

In one embodiment, the polymeric binder is dry mixed together with any additives, functionalized pigments and fillers, and the like, and then is typically melt blended by passing through an extruder. The resulting extrudate is solidified by cooling, and then ground or pulverized to form a powder. Alternatively, the additives described herein may be combined with other compositions to be added to the powder composition after extrusions as post adds.

As discussed above, additives may be added prior to extrusion and be part of the extruded powder composition, or may be added after extrusion. Suitable additives for addition after extrusion include materials that would not perform well if they were added prior to extrusion.

Optional additives can include materials that provide a desired effect on the powder finish or the powder composition, or additives that can improve the application of the powder, the melting and/or curing, or the final performance or appearance. Examples of optional additives which may be useful include: pigments and fillers, else cure catalysts, antioxidants, color stabilizers, anti-corrosion additives, degassing additives, flow control agents, and the like.

Examples

These examples are merely for illustrative purposes only and are not meant to be limiting on the scope of the appended claims. All parts, percentages, ratios, etc. in the examples and the specification are by weight, unless noted otherwise.

An exemplary coating composition of the current invention may include additional materials in varying concentrations as individual needs may require. For example, the composition may further include one or more fillers to control cobwebbing, pigments, fillers, adhesion promoters, and combinations thereof.

If desired, a coating composition of the present invention can include at least 0.1 wt % of a pigment, based on the total weight of the dry epoxy resin. Typically, if used, a coating composition of this invention includes no greater than 5.0 wt % of a pigment, based on the total weight of the solid resin.

When ready for application, the various parts of the coating composition are mixed together immediately prior to spray application. The coating composition can be applied directly over preheated steel with immediate residual heat curing. The flexibility properties of the cured coating composition can be measured pursuant to a bend test provided.

Examples

Premix batches of about 1500 grams each was mixed by a high shear propeller mixer for 35 sec (adequate mixing should be guaranteed in production as well). Mixture was extruded using protective twin screws at 85° C. (Z3) and 123° C. (Zone 4) running at 500 rpm with a 18-20 feeding rate. Chips were ground by a Bantam mill and subsequently sieved by a 94T sized screen.

| Example A (parts by wt) | Example B (parts by wt) |
|---|---|
| Type 7: 1005.8 | Type 7: 1000.0 |
| Type 4: 251.45 | Type 4: 250.0 |
| Toughener: 179.6 | Toughener: 178.57 |
| ADH: 27.16 | SDH: 35.44 |
| Primary Catalyst: 17.8 | Primary Catalyst: 17.4 |
| 2nd Catalyst: 0.89 | 2nd Catalyst: 0.87 |
| Wet flow agent: 13.9 | Wet flow agent: 13.9 |
| Pigments: 14.94 | Pigments: 14.94 |
| Dry flow agent: 0.4% | Dry flow agent: 0.4% |
| TOTAL: 1511.1 | TOTAL: 1511.1 |
| $T_g$: 102.0° C. | $T_g$: 101.4° C. |

Powder was sprayed onto rebars and dowel bars preheated at 232° C. or 239° C. for designed cure times of 30, 25 and 20 sec (35 and 30 secs if 232° C. preheat) or else as specified. Rebar and dowel bar were coated at 8-12mil, bend at −45° C. free of cracks or peels, with minimal tears and normal amounts of cobwebbing for Example B that performed consistently up to 12 months, in addition to a glossy finish without yellowing or discoloring. It should be noted that the existing was a commercial product with a coating composition based on conventional phenolic cure chemistry and its $T_g$ was of 106.7° C. vs. lower $T_g$'s for amine formulations of this invention at 101-103.0° C., Lower Tg's are typically advantageous in terms of flexibility because the latter is inversely proportional to the former to some extent. Test Method: Flexibility testing was carried out with a Tecmor Model SEIM mechanical bender, at −45 ° C. for 2 hours post cure, and for 24 hours post cure. It was 239° C. for 45 min preheat for all.

| | | | Example B | | | |
|---|---|---|---|---|---|---|
| ACR (−45° C. bending) | Existing Phenolic | Example A New ADH | New SDH (fresh & in 2 weeks) | New SDH (in 3 mos) | New SDH (in 6 mos) | New SDH (in 12 mos) |
| Residual heat cure time, sec | 45, 35, 30 | 32, 27, 22 | 45, 35, 30, 25, 20 | 30, 25, 20 | 30, 25, 20 | 30, 25, 20 |
| 2 hours | ≥0.19 (avg.) | ≥0.19 (avg.) | 0 | 0 | 0 | 0 |
| 24 hours | ≥0.19 (avg.) | ≥0.19 (avg.) | 0 | 0 | 0 | 0 |

NOTE:
ACR (actual crack rate) ≤0.19 is considered a pass

Example C of formulation (corresponding to Fig. 5 in the appendix), manufacturing and testing:

| | Comments | Ingredient | wt % |
|---|---|---|---|
| Formulation: | High MW | Type 7 | 65.90 |
| | Medium MW | Type 4 | 16.48 |
| | Toughening resin, EEW981.3 | Toughener | 11.77 |
| | SDH (3-6 microns) | Sebacic dihydrazide | 2.02 |
| | Polyacrylate | Wet flow agent | 0.57 |
| | Principal catalyst | Imidazole, 2-methyl | 1.663 |
| | Additive catalyst | 2PI (60%) | 0.076 |
| | Misc. | Pigments and fillers | 1.06 |
| | Post add | Dry flow agent | 0.45 |
| Processing: | Premix: REOS at high speed for 35 sec; Extruder settings: Zone 3 & 4 85° C. & 118° C.; Grinding: Bantam mill, 94T sieve. | | |
| Coating DSC at 7.0° C./min: | Enthalpy −49.3 J/g, $T_{peak}$ 131.1° C., $T_{onset}$ 107.2° C., $T_g$ 103.1° C. Cure Kinetics: $\frac{d\alpha}{dt} = 25000 \cdot e^{\frac{-49250}{RT}} \cdot \alpha^{0.52} \cdot (1-\alpha)^{0.56}$ | | |

Cure times at 232° C. & 239° C. from cure kinetics: 17.3" and 14.9"

-continued

| Comments | Ingredient | wt % |
|---|---|---|
| Coating physicals Application and Bending: | Gel times: 204° C. −4.5~7.3 sec, 177° C. −12.1 sec<br>Pill flows: 23.2 mm (0.50 g pills at 177° C.)<br>239° C. preheat for 40 min<br>Temperature at spray: ~232° C., dry film thickness (DFT): 8-12 mil<br>Bending results (−45° C.): R-Rebar, D-Dowel | |
| | Cure time, sec  R-28  R-24  R-20  R-18  R-16  D-20  D-18  D-16 | |
| | ACR at 2 hrs:    0    <0.19    0    0    0    0    0    0 | |
| | ACR at 24 hrs:   0    <0.19  <0.19  0    <0.19  0    0    0 | |
| Cure schedules: | 191° C.  204° C.  218° C.  226° C.  232° C.  239° C.  246° C.  255° C.<br>48.5"  33.6"  24.0"  20.2"  17.3"  14.9"  12.5"  11.0" | |

Cure kinetics determined for Example C (i.e., the upgraded SDH formulation) by DSC is listed in the table above, which predicts cure times of 17.3 and 14.9 seconds at 232 and 239° C., respectively, consistent with and confirmed by rebar bending results.

The invention claimed is:

1. A powder coating composition, comprising:
    (a) a flexible dihydrazide amine of an averaged particle size less than 10 microns, represented by the following general structure:

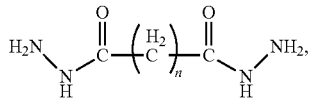

where n=4–20; and
    (b) a dual catalyst package comprising about 1 to 4 phr a principal catalyst and an additive catalyst, wherein the principal catalyst is selected from the group consisting of 2-methyl imidazole (2MI), dimethylaminopyridine, an amine adduct, or an imidazole adduct; and the additive catalyst is an imidazole amine present in an amount of about 1 to 10 wt %, based on the weight of the principal catalyst; and
    (c) an epoxy binder resin system comprising:
        a. 10 wt % to 20 wt % of the toughening resin; and
        b. 80 wt % to 90 wt % of the bulk epoxy resin package comprising a blend of epoxy resins having an EEW of between 800 and 2000; all wt % based on the total weight of the resins, corresponding resin-to-cross-linker stoichiometric molar ratio is 1.2:1 to 3.0:1.

2. The powder coating composition of claim 1, wherein the blend of epoxy resins is a blend of Type 4 resin having an EEW of between 800 and 1225 and Type 7 resin having an EEW of between 1650 and 2000.

3. The powder coating composition of claim 2, wherein the ratio of the amount of the Type 4 resin and the Type 7 resin ranges from 1:8 to 4:1.

4. The powder coating composition of claim 2, wherein the ratio of the amount of the Type 4 resin and the Type 7 resin ranges from 1:6 to 2:1.

5. The powder coating composition of claim 1, wherein the toughening resin is a core-shell-rubber modified (with a MBS copolymer core and a type 4 epoxy shell) or an amphilphilic OP (PEO-PEP) diblock copolymer-modified type 4 epoxy.

6. A coated structural steel rebar, wherein the coated rebar has a coating composition applied thereon, comprising the powder coating composition of claim 1.

7. The coated rebar of claim 6, wherein said powder coating composition cures within 16-28 seconds upon preheat at 239° C.

8. The coated rebar of claim 6, wherein when said coating composition is cured, the coating demonstrates no cracks or tears when rebar bended at −45° C. upon staying at −45° C. for up to 24 hours.

* * * * *